United States Patent
Bryon et al.

(10) Patent No.: US 8,798,430 B2
(45) Date of Patent: Aug. 5, 2014

(54) INSERT FOR AN OPTICAL FIBER ASSEMBLY AND OPTICAL FIBER ASSEMBLY USING SUCH AN INSERT

(75) Inventors: Roel Modest Willy Bryon, Aarschot (BE); Kristof Vastmans, Boutersem (BE); Danny Willy August Verheyden, Gelrode (BE); Geert Van Genechten, Wiekevorst (BE); Pascal Breux, St Martin des Champs (FR); Philippe Lesueur, Trebeurden (FR)

(73) Assignee: Tyco Electronics Raychem BVA, Kessel-Lo (BE)

( * ) Notice: Subject to any disclaimer, the term of this patent is extended or adjusted under 35 U.S.C. 154(b) by 86 days.

(21) Appl. No.: 13/148,646

(22) PCT Filed: Feb. 5, 2010

(86) PCT No.: PCT/EP2010/051411
§ 371 (c)(1), (2), (4) Date: Aug. 9, 2011

(87) PCT Pub. No.: WO2010/092005
PCT Pub. Date: Aug. 19, 2010

(65) Prior Publication Data
US 2011/0311189 A1 Dec. 22, 2011

(30) Foreign Application Priority Data

Feb. 10, 2009 (EP) .................................. 09001853

(51) Int. Cl.
*G02B 6/00* (2006.01)
(52) U.S. Cl.
USPC .......................................... 385/137; 385/100

(58) Field of Classification Search
USPC ............................................................ 385/137
See application file for complete search history.

(56) References Cited

FOREIGN PATENT DOCUMENTS

FR 2917182 A1 12/2008
WO WO 2009/029258 A1 3/2009

OTHER PUBLICATIONS

International Search Report and Written Opinion issued by the European Patent Office, dated May 27, 2010, for PCT/EP2010/051411; 9 pages.
European Search Report issued by the European Patent Office, dated Jul. 9, 2009, for EP09001853; 6 pages.

*Primary Examiner* — Ryan Lepisto
*Assistant Examiner* — Erin Chiem
(74) *Attorney, Agent, or Firm* — Faegre Baker Daniels LLP

(57) ABSTRACT

The present invention relates to an insert for an optical fiber assembly reliably retaining an optical cable by preventing an axial and rotational movement thereof and further to an optical fiber assembly using such an insert. The insert is provided for guiding a part of the optical cable (12) which comprises at least one optical fiber element (14) and being accommodated in a housing of the optical fiber assembly, wherein said part of the optical cable (12) has a cut-out portion (16) in which a jacket (10) of said optical cable (12) is partially removed, thereby exposing said at least one optical fiber element (14). The insert (2) comprises an optical cable guidance means (8) for guiding said optical cable (12) across the insert (2); a recess (26) surrounding the exposed optical fiber element (12) and form fit means (32, 34) for suppressing an axial and rotational movement of the optical cable (12), wherein said form fit means (32, 34) are adapted to abut against surfaces of said jacket in the cut-out portion (16).

11 Claims, 3 Drawing Sheets

INSERT FOR AN OPTICAL FIBER ASSEMBLY AND OPTICAL FIBER ASSEMBLY USING SUCH AN INSERT

The present invention relates to an insert for guiding a part of an optical cable comprising at least one optical fiber element as defined in the preamble of claim 1.

Such an insert is generally provided in a housing of an optical fiber assembly, wherein said housing is sealed by sealing means against environmental influences. Said insert comprises an optical cable guidance means for guiding the optical cable across the insert and a recess for providing an access to an optical fiber element. For this purpose, the jacket of the optical cable is partially removed, thereby exposing at least one optical fiber element in the cut-out portion of the optical cable.

In general, when a user is connected to an optical cable, a few or even one optical fiber element comprised in the optical cable needs to be spliced, that is the optical fiber element needs to be connected to a further optical fiber element coming from the user side by a method of splicing. The thus obtained splice is stored in the housing, preferably on the insert.

The optical cable has normally a jacket surrounding the optical fiber element. A single optical fiber element or a group of optical fiber elements forming part of said cable may likewise be surrounded by a separate jacket. In case of plural groups said optical fiber element has likewise a jacket. In case of plural groups of optical fiber elements, each of them may have a separate jacket, which is at last surrounded by the jacket of the optical cable.

For splicing the optical fiber element, the part of the optical cable which should provide access to the optical fiber element to be spliced is provided with the cut-out portion by partially removing the cable jacket, wherein said part of the optical cable is guided and retained by the insert. The optical fiber element exposed in the cut-out portion is accessible through the recess formed in the insert and surrounding the exposed optical fiber element.

In order to stationary retain the at least one spliced optical fiber element in the housing of the optical fiber assembly, the insert interacts with means for retaining the at least one splice. Further, to prevent a shifting of the spliced optical fiber element held by the insert or a tray connected to the insert, not only the splice needs to be retained, but also the optical cable will be held by the insert. For this purpose, the optical cable is normally attached to the insert by means of cable strip or the like.

The present invention aims to provide an insert for an optical fiber assembly which retains a part of an optical cable having a cut-out portion in a reliable manner. A further object of the present invention is to provide an optical fiber assembly providing the same effects.

For achieving said objectives, the present invention proposes an insert as defined in claim 1 and an optical fiber assembly as specified in claim 7. The inventive insert comprises a form fit means for suppressing an axial and rotational movement of the optical cable, wherein said form fit means are adapted to abut against the surfaces of the cable jacket formed in the cut-out portion.

With the present invention, an insert can be provided which reliably prevents an axial and rotational movement of the optical cable at the insert substantially with the aid of form fitting means. Since the cable jacket needs to be cutout for providing an access to at least one optical fiber comprised in the optical cable, the surfaces of the cut-out portion formed in the cable jacket are used as abutment faces which interact with corresponding abutment faces of form fit means provided with the inventive insert. Particularly, by partially removing the cable jacket, the thus formed jacket surfaces defining the cut-out portion are arranged adjacent to the optical fiber element and extend on the one hand in the running direction of the optical fiber element and extending parallel thereto (parallel surfaces) and on the other hand usually in the radial direction of the optical cable (radial surfaces). By providing abutment faces with the insert which abuts the parallel surfaces extending in the running direction adjacent to the optical fiber element, a rotational movement of the optical cable can be avoided. By providing further abutment faces by the insert abutting at least one radial surface an axial movement of the optical cable can be prevented in at least one direction of the running direction of the optical cable. In case of spaced abutment faces provided by the insert which abuts both radial surfaces at both end sides of the lower surfaces, an axial movement of the optical cable in both direction of its running direction can be reliably prevented.

Further preferred embodiments of the present invention are subject to the dependent claims.

The present invention will now be described in further detail by referring to a preferred embodiment depicted in the accompanying drawings. In these drawings.

Figure 1:
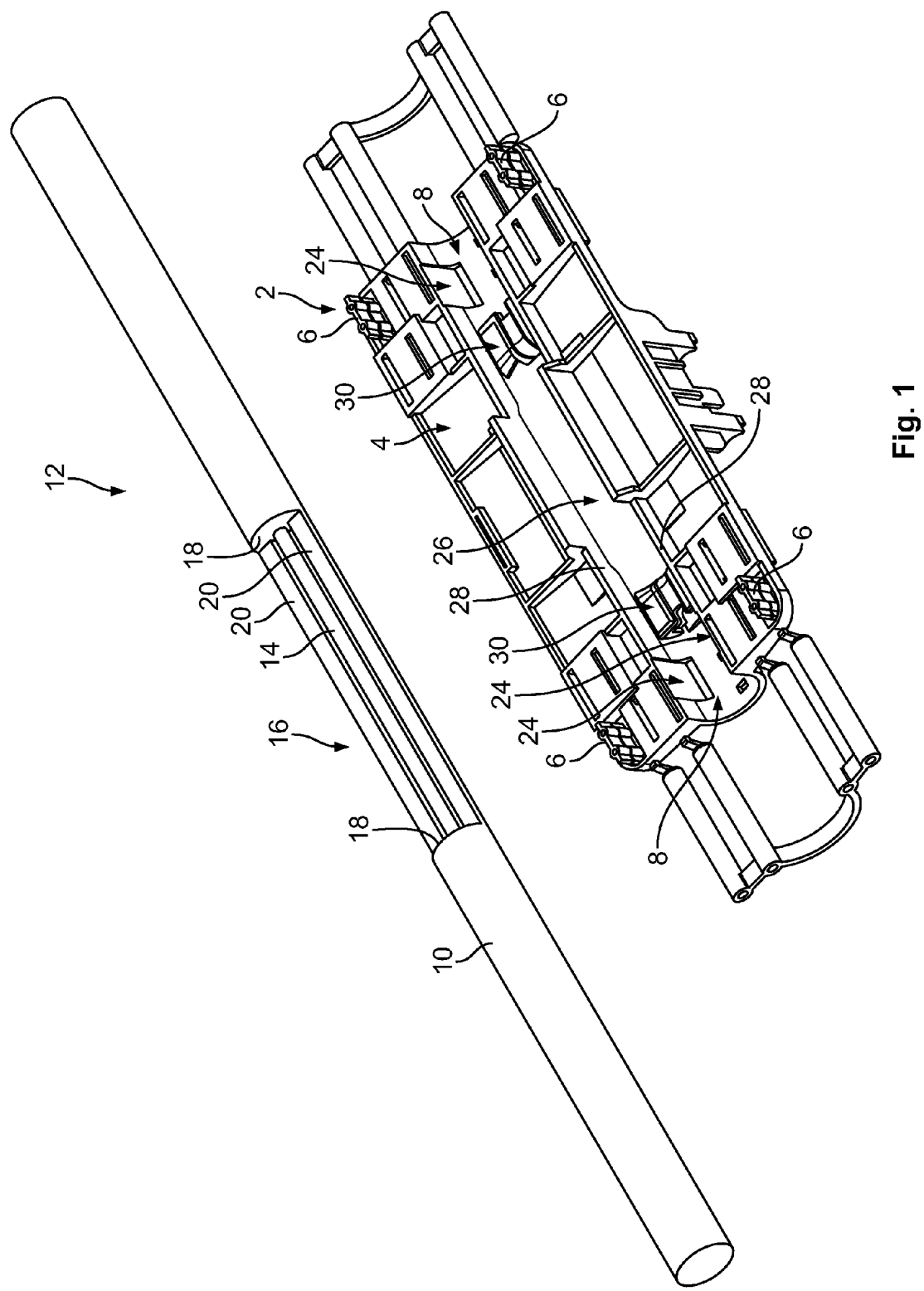
FIG. 1 shows a perspective rear side view of the embodiment together with a cable to be received in said embodiment.

In the figures, reference numeral 2 identifies an insert which is adapted to be inserted into a housing (not shown). The optical cable assembly which can be obtained by using the insert according to the invention will be described at the end of this specific description.

The insert 2 has a flat insert base 4, the lower side thereof (compare FIG. 1) being projected by posts 6 for supporting the insert 2 against the base of a housing element. In the middle of the forward and rearward end of the insert base 4 there are provided optical cable guide means 8 adapted to receive the jacket 10 of an optical cable identified with reference numerals 12 surrounding the lower optical fiber elements 14.

As evident from FIG. 1, the optical cable 12 is provided with a cut-out portion 16 which has been provided by partially removing the jacket 10 of the optical cable 12. In the shown embodiment said cut-out portion 16 is provided between two essentially semi-circular side surfaces 18 and two parallel surfaces 20 which extend parallel to the running direction of the optical fiber elements 14. The uncut, i.e. normal length of the optical cable 12 has a circular cross sectional shape. The optical cable guide means 8 each comprise a semicircular shell 22 adopted to receive and partially surround the jacket 10 of the optical cable 12 adjacent to the cut-out portion 16. Each of said semicircular shells 22, comprises two lateral openings 24 adapted to receive cable fixation means like T-wraps or hose clamps.

Between the optical cable guide means 8 there is provided a rectangular recess 26 recessed within the insert base 4. On the long side of this recess 26 there are provided longitudinal rims 28 projecting the lower side of the inset base 4 and providing lateral guidance for the optical cable 12 in the cut-out portion 16. In the present embodiment, the longitudinal rims 28 have a distance essentially corresponding to the diameter and thus the maximum thickness of the optical cable 12 in the cut-out portion 16.

Between the optical guidance means 8, i.e. the semicircular shell 22 and the end of the recess 26 in longitudinal direction there are provided cross links 30 which extend transverse to the running direction of the optical cable 12 and bridges the space provided between the longitudinal rims 28.

Figure 2:
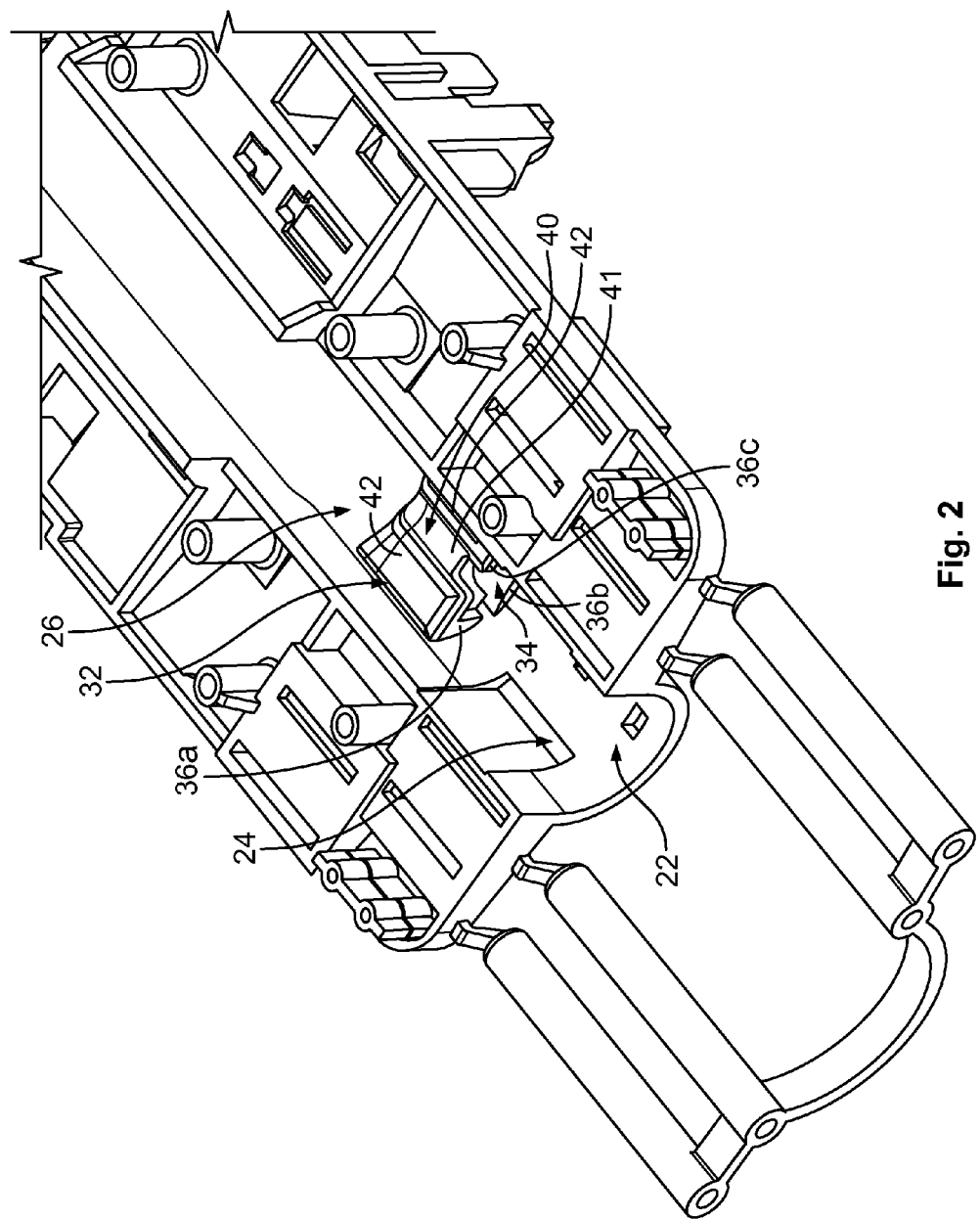
FIG. 2 shows an enlarged view of a section of the embodiment shown in FIG. 2.

The lower side of the each cross link 30 provides first abutment section 32, which is considered to form the first form fit means which are adapted to cooperate with the two parallel surfaces 20 thereby preventing tilting of the optical cable 12 relative to said insert 2 (cp. FIG. 2). Abutment of those first form fit means 32 against the lower side of the cross link 30 is assisted by the cable fixation introduced through the lateral openings 24 and forcing the optical cable 12 towards the upper side of the insert.

Between said abutment section 32 and the inner cylindrical surface of the semicircular shell 22 there is provided a second form fit means 34, provided by wall sections 36a, b, c each of them lying in a single plane, for axially positioning the cut-out portion 16 within the insert 2. In accordance with the shape of the side surfaces 18, which strictly extend in radial direction of the optical fibre 12, wall sections 36a, b, c, project in a right angle from the abutment section 32 and the cylindrical surface of the semicircular shell 22, respectively. The form fit means 34 can likewise be provided by a unitary wall instead of wall section 36 a, b, c. In the present case, the surface 36 is divided into segments as the plane providing this surface is projected by a movable insert of the injection molding mold for making the embodiment.

When providing the cut-out portion 16, the distance between the opposing side surfaces 18 is to be selected such, that this distance essentially corresponds to the distance of the two second form fit means 34.

Figure 3:
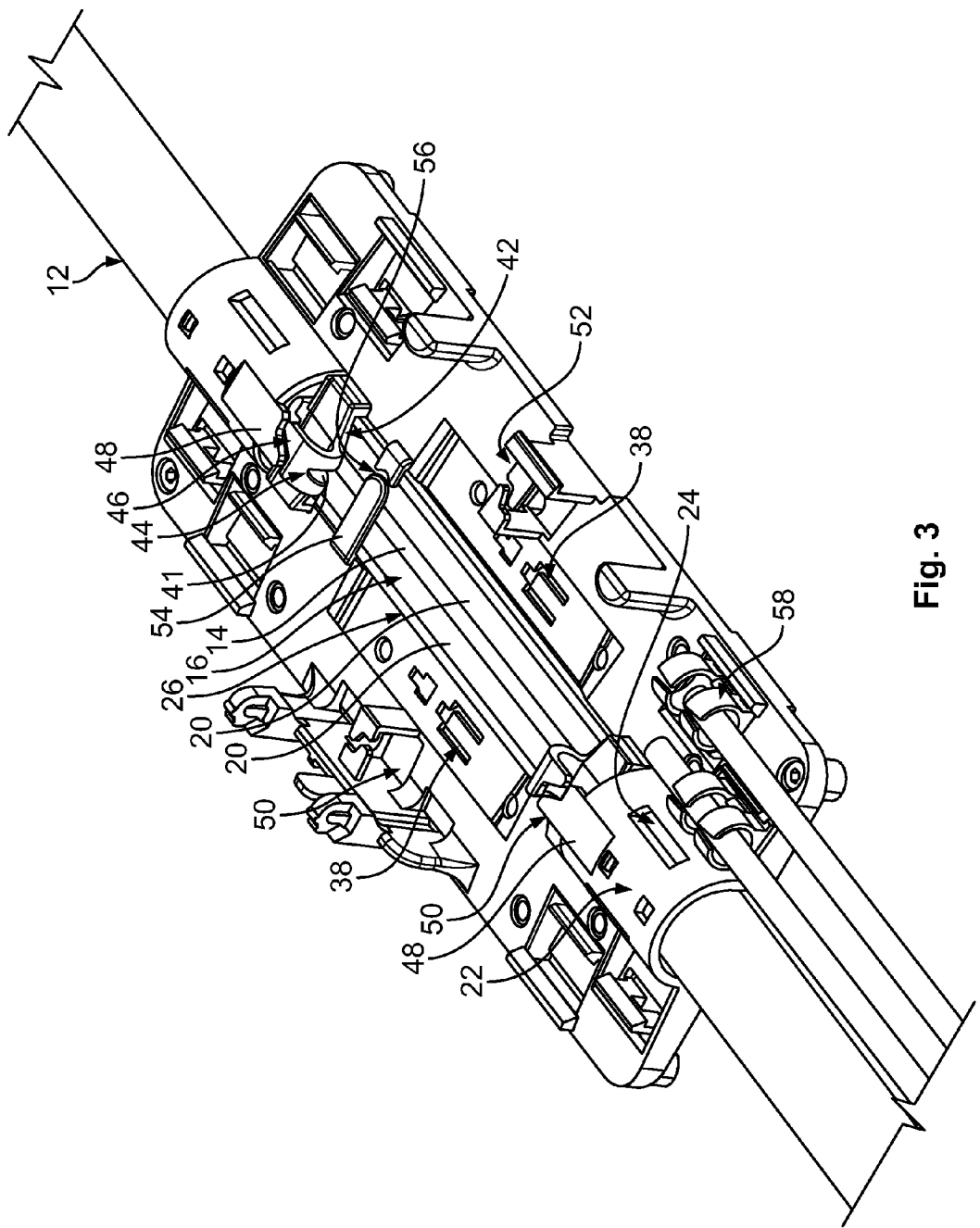
FIG. 3 shows a perspective top view of the embodiment.

After inserting the cut-out portion 16 within the insert 2 such, that this cut-out portion 16 is available through the recess 26, a selected optical fibre element 14 can be pulled out from the optical cable 12 in a reliable manner in which the cable 12 and all remaining optical fibre elements 16 provided in the optical cable 12 is held in place (cp. FIG. 3).

Such pulling operation may e.g. be necessary to splice a selected or plural selected optical fibre elements 14 and connect the same to another optical fibre cable coming e.g. from the user side. In the course of such splicing, a splice will be fixed to both ends of the selected optical fibre elements thereby connecting the same to allow optical signals to be transmitted between both fibre elements. On a general basis, the splice i.e. the splice member, also serves to hold the selected cable in place, which may be arranged in a loop on the insert 2. For holding the splice member, there are provided splice holding means 38 recessed in the insert base 4.

The specific design of the embodiment which facilitates pulling out of selected optical fibre elements 14 from the optical cable 12 are described: reference is made to FIG. 2 showing details of the first and second form fit means 32, 34. The bottom side of crosslink 30 is in fact divided by a central groove 40 extending in the running direction of the optical cable 12 and forming two identical abutment faces 42 each being provided between said groove 40 and the longitudinal rim 28. Adjacent to the second form fit means 34, the groove 40 has a concave surface 41 which is shaped parallel to the longitudinal extension of the optical cable 12. Towards the recess 26, the concave shape 41 in longitudinal direction of the groove 40 is bent upwardly thereby merging into a convex bent element 44 which projects the upper side of the insert base 4 in a constantly smoothly curved manner to a bent of approximately 180° and also, projects from the recess 26 in longitudinal direction of the optical cable 12 (compare FIG. 3). The bent element 44 protrudes in the running direction of the optical fiber elements 14, i.e. it extends parallel to the longitudinal direction of the recess 26.

Adjacent to the groove 40, and in longitudinal extension of the running direction of the optical cable 12, both abutment faces 42 are likewise curved in a convex manner thereby providing a smoothly curved rim merging to the recess 26. The entire contour between the abutment faces 42 and a distal end 46 of the bend element 44 is smoothly curved. The distal end 46 of the bend element 44 extends essentially parallel to the plane of the insert base 4 and parallel to a loop holding member 48 which is connected to the outer circumferential surface of the semicircular shell 22 and in alignment with the distal end 46.

Those loop holding members 48 form part of a loop receiving arrangement 50 provided on the upper side of the insert base 4 and comprising lateral loop holding members 52 positioned in the middle of the insert base 4 in longitudinal direction and at the lateral rim thereof.

FIG. 3 also shows a bar 54 extending across the recess 26 and being provided with a slot 56. This bar 54 has a lower surface adjacent to the parallel surfaces 20 of the cut-out portion 16 and in parallel with those parallel surfaces 20. Thus, the bar 54 may assist positioning of the cut-out portion 16 in a rotational free manner. The ultimate purpose of bar 54 is to hold all optical fibre elements 14 within a remaining groove formed by the jacket 10.

For splicing an individual optical fibre element selected from the optical fibre elements 14, the respective optical fibre element is selected and passed through slot 56. Then, an appropriate length of the selected optical fibre element is prepared by pulling this optical fibre element out of the optical cable 12. In the course of this pulling operation, the selected optical fibre element will be guided by the bend element 44. In case of a pulling action essentially parallel to the running direction of the optical fibre elements 14, the selected optical fibre element will be guided within groove 40. In case of pulling the selected optical fibre element essentially perpendicular to the plane receiving insert base 4, i.e. in the plane of the running direction of the optical fibre elements 14 but essentially perpendicular thereto, there is sufficient smooth guiding of the selected optical fibre element. This guiding prevents the optical fibre element from sliding along sharp edges and from being damaged upon the pulling out performance. In case the selected optical fibre element is by error is pulled out in a direction angular to the running direction of the remaining optical fibre elements 14, the entirely smooth surface of the lower side of the crosslink 30 and the transition of said crosslink 30 towards the recess 26 prevents damage of the optical fibre.

After complete pulling out of the selected fibre element, the same is cut and spliced. The excessive length of the selected fibre element and possibly any excessive length of a optical fibre cable coming from a user and being connected to the selected optical fibre element is received in the loop holding arrangement 50. Thus, the loop will run between the bend element 44 and the semicircular shell 22. Storing of the loop will not contribute to the height of the insert 2. Additionally, in case of need of splicing a further optical fibre element and selecting the same by pulling this optical fibre element out from the optical cable 12, pulling action of this further selected optical fibre element will not interfere with any loop of other optical fibre elements already stored in the insert.

For a complete description, in particular of the embodiment as depicted in FIG. 3, it should be mentioned that there are provided cable jacket termination units 58 formed as separate elements adapted to receive and hold the terminal end of a jacket of an optical fibre cable from a user. Those jacket termination units 58 are received in openings recessed in the insert base 4 and held therein by snapping mechanisms.

The insert 2 prepared in the above-mentioned way will be incorporated into a housing which provides ports for all optical cables being fed into the housing. This housing is adapted to hermetically seal those optical cables to avoid entry of water and/or humidity into the housing.

The invention claimed is:

1. An insert for guiding a part of an optical cable comprising at least one optical fiber element and accommodated in a housing of an optical fiber assembly, said part of the optical cable has a cut-out portion in which a jacket of said optical cable is partially removed, thereby exposing said at least one optical fiber element, the cut-out portion of the jacket includes parallel longitudinal surfaces extending parallel to the optical fiber element in a longitudinal direction of the optical fiber element and parallel radial surfaces extending perpendicularly to the longitudinal surfaces, wherein said insert comprises:
an optical cable guidance means for guiding said optical cable across the insert;
a recess surrounding the exposed optical fiber element; and
form fit means for suppressing an axial and rotational movement of the optical cable, wherein said form fit means are adapted to abut against the longitudinal and radial surfaces of said jacket in the cut-out portion, the form fit means comprising a crosslink having on its lower side an abutment section adapted to interact with longitudinal surfaces of the jacket in the cut-out portion, said parallel surfaces partially surrounding the optical fiber element in the longitudinal direction, and the form fit means further comprising at least one wall section adapted to interact with the radial surfaces of the jacket in the cut-out portion, and the radial surfaces define longitudinal ends of the cut-out portion.

2. The insert according to claim 1, wherein said abutment section is comprised of two abutment faces divided by a groove.

3. The insert according to claim 1, wherein a surface plane of said wall section intersects with a surface plane of said crosslink.

4. The insert according to claim 1, wherein said insert further comprises a hold-down device for holding remaining optical fiber elements, wherein said hold-down device crosses the recess and forms an abutment face adapted to interact with the parallel surfaces of the cable jacket in the cut-out portion, thereby suppressing a rotational movement of the optical cable, and has a slot for separating an optical fiber element from the cut-out portion.

5. An optical fiber assembly according to claim 1, wherein said recess is defined between longitudinal rims extending in the longitudinal direction of said recess and providing guidance of the cut out portion.

6. The insert of claim 1, wherein the guidance means have a shape that is generally complimentary to that of the optical cable.

7. The insert of claim 6, wherein the guidance means are comprised of a lower portion and an upper portion, the lower and upper portions being generally rounded.

8. The insert of claim 1, wherein the form fit means is positioned above at least a portion of the exposed optical fiber element.

9. The insert of claim 8, wherein the form fit means is positioned above at least a portion of the cut-out portion.

10. The insert of claim 1, wherein the form fit means includes a first form fit means and a second form fit means, a longitudinal length of the cut-out portion is approximately equal to a distance between the first and second form fit means.

11. An optical fiber assembly for an optical cable comprising:
a housing with a housing lower body and a housing upper body enclosing an insert;
sealing means for sealing the housing; and
at least one optical fiber element accommodated in the housing, part of the optical cable has a cut-out portion in which a jacket of said optical cable is partially removed, thereby exposing said at least one optical fiber element, the cut-out portion of the jacket includes parallel longitudinal surfaces extending parallel to the optical fiber element in a longitudinal direction of the optical fiber element and parallel radial surfaces extending perpendicularly to the longitudinal surfaces, wherein said insert comprises:
an optical cable guidance means for guiding said optical cable across the insert; a recess surrounding the exposed optical fiber element; and
form fit means for suppressing an axial and rotational movement of the optical cable, wherein said form fit means are adapted to abut against the longitudinal and radial surfaces of said jacket in the cut-out portion, the form fit means comprising a crosslink having on its lower side an abutment section adapted to interact with longitudinal surfaces of the jacket in the cut-out portion, said parallel surfaces partially surrounding the optical fiber element in the longitudinal direction, and the form fit means further comprising at least one wall section adapted to interact with the radial surfaces of the jacket in the cut-out portion, and the radial surfaces define longitudinal ends of the cut-out portion.

* * * * *